Dec. 6, 1966
C. M. WHITE ETAL  3,290,367
PREPARATION OF $C_8$ TO $C_{12}$ ALPHA, OMEGA-ALIPHATIC DIACIDS
Filed July 22, 1963
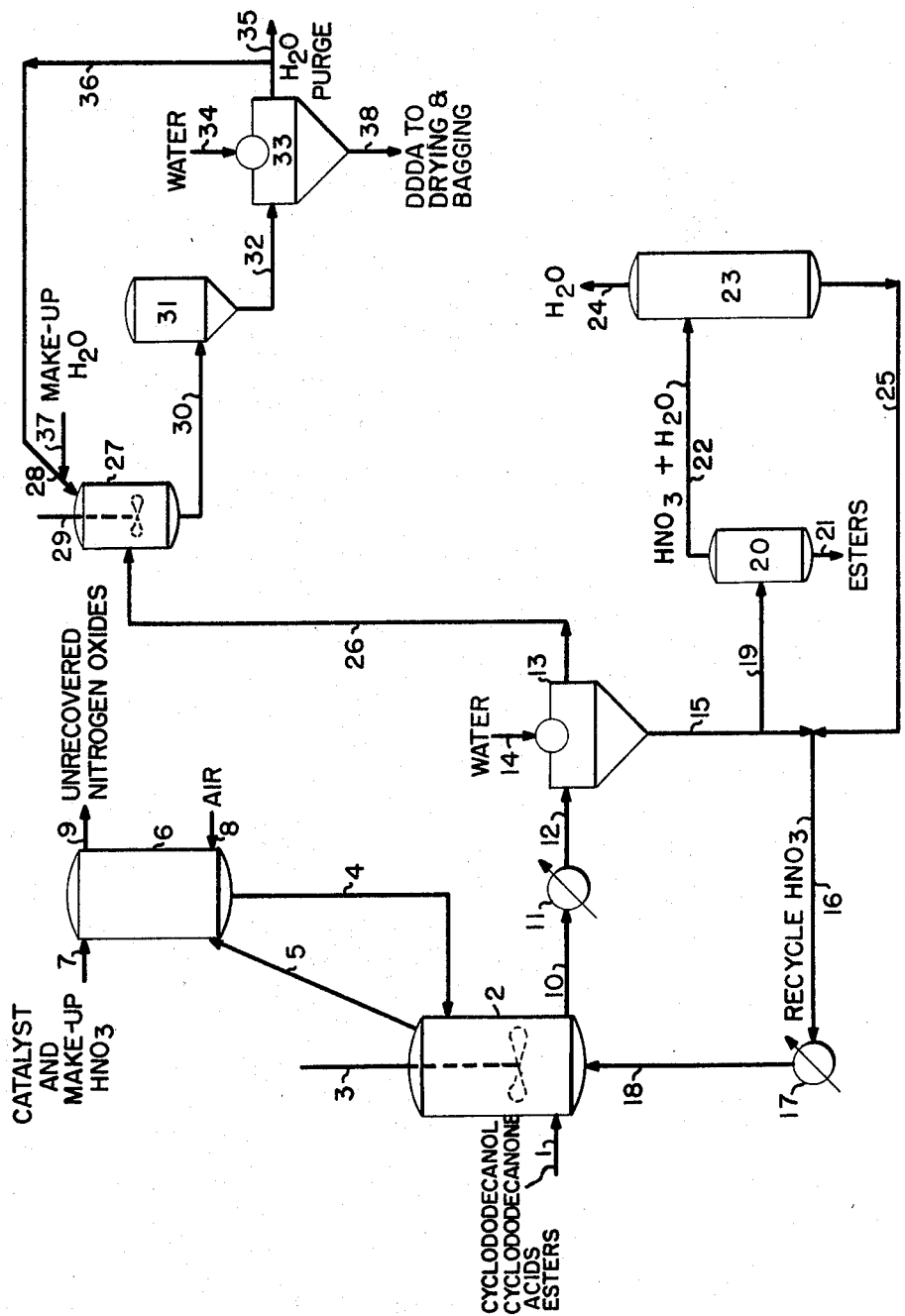
Charles Marlin White
Vincent L. Hughes      Inventors
William E. Wellman
By  *Frank A. Simmock*
Patent Attorney 3,290,367
PREPARATION OF C₈ TO C₁₂ ALPHA,OMEGA-
ALIPHATIC DIACIDS
Charles Marlin White, Westfield, Vincent L. Hughes,
Scotch Plains, and William E. Wellman, Edison, N.J.,
assignors to Esso Research and Engineering Company,
a corporation of Delaware
Filed July 22, 1963, Ser. No. 297,735
9 Claims. (Cl. 260—531)

This application is a continuation-in-part of U.S. Serial No. 134,800, filed August 25, 1961, now abandoned.

The present invention relates to a new and improved process for the preparation of $C_8$ to $C_{12}$ $\alpha,\omega$-aliphatic diacids and particularly to the preparation of 1,12-dodecanedioic acid, DDDA, of sufficiently high quality to give a polymer grade DDDA after purification. More particularly this invention relates to oxidizing a $C_8$ to $C_{12}$ cyclic alcohol and/or ketone (preferably prepared by air oxidizing the corresponding cyclic paraffin e.g. cyclooctane or cyclododecane) with nitric acid under controlled conditions to obtain high yields of the corresponding diacid. Yet more particularly in a preferred embodiment this invention relates to directly oxidizing cyclooctanol, cyclooctanone, cyclododecanol and cyclododecanone as a slurry in the absence of a solvent, utilizing nitric acid having a concentration of 50–70 wt. percent preferably 60 wt. percent in the presence of a combination catalyst (ammonium vanadate and copper) for reaction times of above 1 hour at temperatures of 55–75° C. preferably at about 60° C. followed by hot filtration of the reaction mix to reject, as filtrate-soluble material, the lower molecular weight byproduct dibasic acid and nitrogen-containing impurities. In a further embodiment, this invention relates to carrying out the aforesaid nitric acid oxidation in a staged reactor wherein the reaction products from the first stage are heat soaked for a period of at least one hour in the second stage and wherein at least a portion of the filtrate of crude lower dibasic acids, nitrogen impurities and nitric acid is recycled to the first stage of the nitric acid oxidation.

The present invention is of considerable importance in view of the recent discovery that butadiene can be dimerized to 1,5-cyclooctadiene or trimerized to 1,5,9-cyclododecatriene in the presence of a metallo organic catalyst such as a titanium comprising catalyst. Thus, the process for preparing these materials is described for example in Angewandte Chemie, V. 69, No. 11:397 (June 7, 1957). According to this process both extremely high conversions and selectivities are obtained to the desired materials. These materials can be cheaply converted by hydrogenation to the corresponding cycloparaffins, e.g. cyclododecane and cyclooctane, which are then air oxidized to the corresponding alicyclic alcohols and ketones used in the present process. A preferred method for carrying out this air oxidation is described in S.N. 23,632 filed April 21, 1960 resulting in a product, the major proportion of which is the cyclo-alcohol and a minor portion of which is the cyclo-ketone. As is well known and as is described in the above identified Journal the $\alpha,\omega$-C₈–C₁₂ diacids are extremely useful in the preparation of nylon type materials.

The prior art processes over which the present invention defines large advantages involve the oxidation of cyclohexanone or cyclohexanol with nitric acid to adipic acid particularly as exemplified by Brown et al., U.S. Patent 2,831,024 issued April 15, 1958. Although the Brown et al. patent refers to cycloparaffins having from about 4 to about 9 carbon atoms in their molecule as suitable feed materials, the only C₈ cycloparaffin specifically disclosed is dimethyl cyclohexane. The latter, however, is incapable of yielding 1,8-octanedioic acid. Attempts to use this technique for oxidizing C₁₂ cyclic alcohols or ketones result in very low selectivity to the desired $\alpha,\omega$-dibasic acids and difficulties in purification of the dibasic acids to satisfactory color or "Polymer Grade" due to the insolubility of the C₁₂ cyclic alcohol and ketone and the straight chain product compounds in the oxidizing medium. Additionally, attempts to utilize a solubilizer also resulted in low yields of the desired product diacids. Thus, for example, utilizing only nitric acid without a solubilizer at the concentrations ordinarily used in the adipic acid process resulted in large amounts of yellow viscous oily material which caused yields of the desired material to be very low. Similarly when a solvent was used yields in the order of only about 80% were obtained as compared to the about 90% yields obtained by the process of this invention.

It has now been surprisingly found that by utilizing a particular narrowly defined concentration of nitric acid, i.e. 50–70, preferably 55–65 wt. percent and most preferably 60 wt. percent and in large amounts, i.e. mol ratios of nitric acid to feed of from about 20/1 to about 30/1 at moderate temperatures of about 60° C. and long reaction times high yields are obtained in a heterogeneous reaction mixture and that filtration of the reaction mixture at controlled high temperatures surprisingly produces high yields of the desired dibasic acids, the low molecular weight byproducts and nitrogen-containing impurities being rejected in the filtrate. The resultant dibasic acids are of high quality and may be readily upgraded to white or "Polymer Grade" product by a simple recrystallization. Further, according to the present process, part of the filtrate (the filtrate containing about 10% of the organic material in the reaction products) can be recycled to the reaction zone to convert part of the nitrogen impurities to nitrogen oxides and dibasic acids.

It has now been found that the following reaction conditions, and only these conditions, produce the desired high yields of dibasic acids of high quality and containing low amounts of nitrogen impurities.

1. CONCENTRATION AND AMOUNT OF
NITRIC ACID

Nitric acid is continuously supplied so as to maintain nitric acid concentrations (expressed as wt. percent HNO₃ in solution of water and HNO₃) in the reaction vessel within the range of 50–70 wt. percent, preferably 55 to 65 wt. percent, e.g. 60 wt. percent. The mole ratio of nitric acid to organic feed material is at least 20:1 and is preferably about 24:1 to about 30:1. It has now been found that these concentrations and amounts of nitric acid are critical to obtain the desired high yields, low product nitrogen contents and high product quality, particularly color, required.

2. CATALYST

A mixture of ammonium vanadate and copper as catalyst is required in a preferred embodiment to obtain high yields and low nitrogen contents in the product dibasic acids. The weight ratio of copper to ammonium vanadate in this catalyst must be in the range of 1:1 to 5:1, preferably 3:1. The amount of ammonium vanadate catalyst based on the feed organic material supplied to the reactor, is about 0.05 to about 1.0 wt. percent preferably 0.3 to 0.7 wt. percent.

3. TEMPERATURE

Temperatures are in the range of 55 to 75° C., preferably about 60° C. These temperatures are also critical to obtain the desired high yields, low product nitrogen contents and high quality, particularly color, desired. Temperatures of about 70–75° C. give products of low nitrogen content but also result in the formation of C₁₁ dibasic acids. At temperatures below 60° C., the nitrogen and neutral impurity content of the product are increased slightly and the operation of the oxidation becomes more difficult due to the problems of cooling this highly exothermic reaction to the lower temperatures.

4. REACTION TIMES

In a preferred embodiment, reaction times of ¾ to 4 hours, preferably about 1½ to 2 hours are required again for the same purposes. Thus nitrogen impurities are apparently consumed during the later stage of the reaction in addition to further conversion to dibasic acids. In a further embodiment a second reactor stage is utilized to obtain complete conversion and high purities and preferably the reaction is conducted continuously through a sufficient number of stages or with adequate contact time of nitric acid and organic feed.

Following completion of the reaction, the reaction mixture slurry is filtered with or without the prior addition of water at a temperature in the range of 35 to 90° C., preferably 50 to 85° C., more preferably 60 to 75° C., e.g. 70° C. In a preferred embodiment, additional water is added to the reaction mixture slurry prior to filtration in order to obtain hydrolysis of any nitrogen-containing impurities and thereby obtain a crude diacid filter cake of improved purity. Additional filtration to recover more product from the filtrate may be conducted at lower temperatures, preferably in the range of 50 to 70° C., e.g. 60° C. This provides large purity improvement with small decrease in yield, the product being obtained as the filter cake. The crude filter cake containing e.g. about 83 to 97 mol percent of the desired dibasic acid may then be further purified by recrystallization(s) from water and/or recrystallization(s) from other solvents such as ethyl acetate, glacial acetic acid, or mixtures of water and acetic acid.

The present invention will be more clearly understood from a consideration of a preferred flow plan for the production of a particular diacid, 1,12-dodecanedioic acid (DDDA). The feed stock is a mixture of cyclododecanol, cyclododecanone, esters and acids produced by the air oxidation of cyclododecane. Referring now to the figure, the feed is supplied through line 1 to the reactor 2 equipped with stirrer 3. Nitric acid and catalyst are supplied to reactor 2 through line and nitrogen oxide gases from the oxidation are taken overhead through line 5 and are passed to scrubber 6. Makeup nitric acid (containing dissolved catalyst components, e.g. ammonium vanadate and copper) is supplied to the top of the scrubber through line 7 and air is supplied to the bottom of the scrubber through line 8 to further oxidize part of these gases to the particular nitrogen oxides which form nitric acid when absorbed in the makeup nitric acid stream. Unrecovered nitrogen oxides are taken overhead from the scrubber through line 9 and are neutralized in caustic to prevent their escape to the atmosphere. From the bottom of the tower the enriched nitric acid containing nitrogen oxides and dissolved catalyst is passed back to reactor 2 via line 4 as previously described. From the bottom of the reactor the slurry of reaction products is passed through line 10 to heater or cooler (depending upon the reaction and filtration temperature utilized) 11 and thence through line 12 to filter 13 (preferably a cyclic centrifugal filter). Small amounts of wash water are supplied during the wash cycle through line 14 to remove a large portion of the residual reaction liquid from the filter cake. Filtrate is passed through line 15 and a part of the stream is passed through line 16, heater 17 and line 18 back to the reactor 2. The remainder of the stream is passed (together with all of the filtrate obtained during the wash cycle) through line 19 to a crystallization or evaporation vessel 20 for separation of esters and byproducts through line 21. Nitric acid and water are passed overhead through line 22 to distillation column 23 from which water is removed overhead through line 24 to obtain a concentration of nitric acid. The nitric acid is withdrawn from the bottom of column 23 and recycled through line 25 back to line 16 and thence via heat exchanger 17 and line 18 into the reactor 2. While the reactor is shown as a single vessel, it will be understood that two or more reactors may be arranged in series to permit staging or conduct of the oxidation reaction continuously.

From filter 13, the crude dodecanedioic acid filter cake is transferred through line 26 to water recrystallization step in drum 27, water being supplied through line 28. The vessel is stirred by stirrer 29 and the temperatures are in the range of 125 to 175° C., preferably 140 to 175° C., e.g. 150° C. The mixture of dodecanedioic acid and water is passed (after cooling if desired) through line 30 to crystallization vessel 31 operated at temperatures in the range of 90 to 110° C., preferably 90 to 100° C., e.g. 100° C. The slurry is then passed through line 32 to filter 33, preferably a cyclic centrifugal filter, supplied with wash water through line 34. Water containing dissolved impurities is removed through line 35, part of the water being recycled through line 36, with makeup water supplied through line 37 to line 28. The filter cake of high purity dodecanedioic acid is removed through line 38 and is passed to drying and bagging as the product from the process or is additionally purified if desired.

The present invention will be more clearly understood from a consideration of the following examples clearly illustrating the advantages obtained specifically by utilizing the critical procedures described above.

*Example 1*

Nitric acid oxidation of typical cyclododecanol and cyclododecanone mixtures were carried out batchwise using mixed copper, ammonium vanadate catalyst under a variety of reaction conditions to produce dodecanedioic acid, DDDA. The reaction conditions and the results obtained are summarized in Table I.

TABLE I.—DDDA BY HNO OXIDATION-BATCH VARIABLE STUDIES

| Run No | 1 | 2 | 3 | 4 | 5 | 6 | 7 | 8 |
|---|---|---|---|---|---|---|---|---|
| Feed: | | | | | | | | |
| G.[1] | 50 | 50 | 50 | [5]100 | 50 | 50 | 50 | 50 |
| Moles | 0.272 | 0.272 | 0.272 | 0.544 | 0.272 | 0.272 | 0.272 | 0.272 |
| $HNO_3$: | | | | | | | | |
| Strength, wt. percent | 60 | 70 | 70 | 60 | 60 | 60 | 60 | 60 |
| Cc | 500 | 410 | 410 | 370 | 610 | 275 | 275 | 385 |
| Moles | 6.48 | 6.48 | 6.48 | 4.86 | 7.89 | 3.56 | 3.56 | 4.86 |
| Ratio: $HNO_3$, mol./Feed mol | 23.8 | 23.8 | 23.8 | 8.9 | 29.0 | 13.1 | 13.1 | 17.9 |
| Cat. conc.: | | | | | | | | |
| $NH_4VO_3$, wt. percent | .05 | .05 | .05 | .05 | .05 | .05 | .05 | .05 |
| Cu, wt. percent | .15 | .15 | .15 | .15 | .15 | .15 | .15 | .15 |
| Conditions: | | | | | | | | |
| Add Time, min.[2] | 20 | 23 | 20 | 40 | 22 | 20 | 28 | 21 |
| Add Temp., ° C | 60 | 60 | 70 | 60 | 60 | 60 | 50 | 60 |
| Run Time, min.[3] | 50 | 50 | 50 | 100 | 50 | 50 | 50 | 60 |
| Run Temp., ° C | 70 | 70 | 70 | 70 | 60 | 50 | 70 | 62 |
| Yield, crude, g | 52.2 | 52.0 | 50.8 | 105.1 | 54.1 | 53.6 | 52.8 | 53.1 |
| Wt. percent on feed | 104.4 | 104.0 | 101.6 | 105.1 | 108.2 | 107.3 | 105.6 | 106.2 |
| DDDA, mole percent on feed | 78.7 | 76.0 | 69.6 | 75.4 | 80.5 | 77.5 | 77.1 | 77.3 |
| $C_{11}$ DBA, mole percent on feed | 4.8 | 6.5 | 11.6 | 5.7 | 4.7 | 4.0 | 2.9 | 3.3 |
| N.E.* | 116.1 | 115.3 | 114.5 | 121.8 | 114.6 | 124.9 | 121.0 | 124.1 |
| Crude color | White | White | White | Yellow | White | Yellow | Yellow | Yellow |
| Nitrogen, p.p.m | 910 | 390 | 340 | 7,280 | 798 | 4,137 | 3,670 | 2,625 |
| Unknowns,[4] wt. percent | | | | 3.1 | | 4.4 | 4.8 | 5.1 |

See footnotes at end of tables.

| Run No. | 9 | 10 | 11 | 12 | 13 | 14 [5] | 15 | 16 |
|---|---|---|---|---|---|---|---|---|
| Feed: | | | | | | | | |
| G.[1] | 50 | 50 | 50 | 50 | 50 | 50 | 50 | 50 |
| Moles | 0.272 | 0.272 | 0.272 | 0.272 | 0.272 | 0.272 | 0.272 | 0.272 |
| $HNO_3$: | | | | | | | | |
| Strength, wt. percent | 60 | 60 | 60 | 60 | 60 | 60 | 60 | 60 |
| Cc. | 375 | 375 | 500 | 375 | 500 | 500 | 500 | 610 |
| Moles | 4.86 | 4.86 | 6.48 | 4.86 | 6.48 | 6.48 | 6.48 | 7.89 |
| Ratio: $HNO_3$, mol./Feed mol | 17.9 | 17.9 | 23.8 | 17.9 | 23.8 | 23.8 | 23.8 | 29.0 |
| Cat. conc.: | | | | | | | | |
| $NH_4VO_3$, wt. percent | .15 | .33 | .33 | .5 | .5 | .5 | .67 | .67 |
| Cu, wt. percent | .45 | 1.0 | 1.0 | 1.5 | 1.5 | 1.5 | 2.0 | 2.0 |
| Conditions: | | | | | | | | |
| Add Time, min.[2] | 20 | 20 | 20 | 70 | 71 | 30 | 70 | 72 |
| Add Temp., °C | 60 | 60 | 60 | 60 | 60 | 60 | 60 | 60 |
| Run Time, min.[3] | 72 | 75 | 76 | 5 | 5 | 30 | 5 | 5 |
| Run Temp., °C | 60 | 60 | 60 | 60 | 60 | 60 | 60 | 60 |
| Yield crude, g | 54.3 | 55.9 | 55.1 | 56.0 | 56.0 | 56.4 | 56.4 | 55.6 |
| Wt. percent on feed | 108.6 | 111.8 | 110.2 | 112.0 | 112.0 | 112.8 | 112.8 | 111.2 |
| DDDA, mole percent on feed | 81.8 | 84.6 | 85.7 | 86.6 | 86.8 | 84.0 | 87.9 | 87.1 |
| $C_{11}$ DBA, mole percent on feed | 3.1 | 2.3 | 2.2 | 1.9 | 2.5 | 2.8 | 1.6 | 1.5 |
| N.E.* | 119.0 | 120 | 116.7 | 121 | 116.8 | 127 | 118.3 | 116.9 |
| Crude color | Yellow | Yellow | White | Yellow | Off-white | Yellow | Off-white | Off-white |
| Nitrogen, p.p.m. | 3,565 | 910 | 1,457 | 2,190 | 1,240 | 3,773 | 1,704 | 1,265 |
| Unknowns,[4] wt. percent | 1.9 | 2.8 | 0.3 | 1.1 | 0.4 | 2.9 | 0.5 | 0.4 |

[1] Feed composition was 78.8 wt. percent cyclododecanol, 20.8 wt. percent cyclododecanone, 0.4 wt. percent unknowns and a trace of cyclododecane (by gas chromatographic analysis).
[2] Time required to add all of the feed to the reactor.
[3] Additional reaction time after feed was completely added.
[4] Neutral materials which appear after the DDDA peak in gas chromatography of the methyl esters. They appear to be directly related to the yellow color observed in the crude product.
[5] Feed concentration was doubled to allow good mixing at this low $HNO_3$-feed ratio.
[6] Run No. 14 was run at 75–100 mm. Hg pressure.
*N.E.—Neutralization Equivalent is obtained by titration with 1/10 normal NaOH. This is a rough approximation of product purity. Theoretical N.E. for DDDA=115.

The above data show the effect of increasing the nitric acid: organic feed ratio and the catalyst concentration on DDDA yield and purity. Run Nos. 1 and 5 show that product of good color is obtained in fair yields with 60 wt. percent nitric acid at high acid to organic feed ratios (23.8:1) and low catalyst concentration. Higher acid strength (70 wt. percent) in Run No. 2 caused higher degradation to $C_{11}$ dibasic acid, the combination of 70 wt. percent acid and higher temperatures in Run No. 3 causing a very marked increase in the amount of $C_{11}$ DBA formed. Runs 13, 15 and 16 demonstrate the advantages of the combination of high acid: organic feed ratio, high catalyst concentration and relatively low acid strength (60 wt. percent) and low temperatures of 60° C. particularly in the minimization of the amount of unknowns which appear to be directly related to the yellow color observed in the crude product.

Example 2

On basis of the work summarized in Table I, the following conditions for the oxidation of cyclododecanol-one to DDDA were utilized in a series of continuous runs in a continuous stirred reactor pilot unit:

| | |
|---|---|
| Reaction temperature °C | 60 |
| Reaction stages | 1 |
| $HNO_3$ concentration wt. percent | 60 |
| $HNO_3$—feed ratio: | |
| Mole basis | 24–30 to 1 |
| Wt. basis | 8–10 to 1 |
| Catalyst concentration (based on organic feed): | |
| $NH_4VO_3$ wt. percent | 0.5–0.7 |
| Cu do | 1.5–2.0 |

The results of a series of runs in the pilot unit are summarized in Table II.

TABLE II.—CONTINUOUS $HNO_3$ OXIDATION OF CYCLODODECANOL-ONE TO DDDA—ONE-STAGE REACTOR

| Run No. | 1 | 2 | 3 | 4 | 5 | 6 | 7 | 8 | 9 | 10 |
|---|---|---|---|---|---|---|---|---|---|---|
| $HNO_3$ Strength, wt. percent | 60 | 60 | 60 | 60 | 60 | 60 | 60 | 60 | 60 | 60 |
| Feed Ratio, Moles $HNO_3$/Mole Organic | 27.0 | 24.4 | 26.8 | 27.6 | 27.2 | 26.8 | 30.6 | 27.7 | 25.2 | 26.6 |
| Cat. Conc., wt. percent on feed: | | | | | | | | | | |
| Cu | 1.8 | 1.6 | 1.7 | 1.8 | 1.6 | 1.7 | 2.0 | 1.8 | 1.6 | 1.7 |
| $NH_4VO_3$ | 0.6 | 0.5 | 0.6 | 0.6 | 0.5 | 0.6 | 0.7 | 0.6 | 0.5 | 0.6 |
| Conditions: | | | | | | | | | | |
| Temperature, °C | 60 | 60 | 60 | 60 | 60 | 60 | 60 | 60 | 60 | 60 |
| Avg. Residence Time, min | 53 | 53 | 49 | 52 | 49 | 50 | 50 | 49 | 43 | 43 |
| Yield, Avg.: | | | | | | | | | | |
| Crude, wt. percent on feed | 111.5 | 111.5 | 111.5 | 111.5 | 111.5 | 111.5 | 111.5 | 111.0 | 111.0 | 111.0 |
| DDDA, mole percent on feed | 87.5 | 87.5 | 87.5 | 87.5 | 87.5 | 87.5 | 87.5 | 87.4 | 87.4 | 87.4 |
| Product Distribution in Crude, wt. percent: | | | | | | | | | | |
| DDDA | 97.7 | 97.7 | 98.3 | 98.2 | 98.5 | 97.1 | 98.3 | 98.4 | 98.1 | 98.6 |
| $C_{11}$ Diacid | 2.1 | 1.8 | 1.2 | 1.4 | 1.1 | 2.5 | 1.3 | 1.1 | 1.8 | 0.9 |
| $C_{10}$ Diacid | | | 0.3 | | 0.3 | 0.2 | 0.2 | 0.2 | 0.1 | 0.3 |
| Other [1] | 0.2 | 0.2 | 0.2 | 0.2 | 0.1 | 0.2 | 0.2 | 0.3 | | 0.2 |
| Crude Quality: | | | | | | | | | | |
| Absorbance [2] | 11.5 | 10.8 | 11.5 | 12.4 | 11.8 | 11.1 | 12.3 | 11.6 | 10.0 | 12.3 |
| Melting Pt. Range, °C | 127–8 | 127–8 | 126.5–7.5 | 127–8 | 127–8 | | | | | |
| Neut. Equivalent | 113.5 | 113.9 | 114.1 | 113.8 | 114.7 | | 114.4 | 113.3 | | 113.9 |

[1] Unidentified materials which are eluted after the methyl ester of DDDA in the G.C. analysis.
[2] Measured at 384 mμ on Beckman Model DB Spectrophotometer using 1 g. DDDA in 25 ml. of 7 wt. percent ammonia solution.

The above data show that at nominal residence times of 43–55 minutes the yields of DDDA obtained and the purity of the crude product obtained were as expected from the batch data of Example 1, i.e. DDDA yields of about 87 mol percent and crude purity of approximately 98 wt. percent. The color of the product of these continuous runs was superior to that of the batch product. Quantitative measurement showed the continuous product to have only ⅕ to ¹⁄₁₀ the color formers of the batch product.

Example 3

In view of the closely comparable results from batch and continuous oxidation runs, a number of oxidation runs were conducted in batch equipment to study the effect of nitric acid recycle. In these runs, the oxidation reaction mixture was filtered and the filtrate combined with makeup nitric acid and water washes of the DDDA filter cakes. The dilute nitric acid and catalyst was then reconstituted by distilling off water and the nitric acid thus obtained was used in the subsequent oxidation. Catalyst makeup was arbitrarily set at 20% of initial concentration.

During the course of the ten (10) recycle runs (representing approximately one reactor turn-over of $HNO_3$) there was an average consumption of 3.0 mols of $NHO_3$/mol of DDA.

The overall yield of DDDA from these runs was >89 mol percent. The system appeared to reach steady state after the fifth run. For the last five runs, the DDDA yield was 90±2 mole percent and the DDDA content of the crude product was 96±1 wt. percent, no significant change in product color or the appearance of new by-products was observed. Detailed data for the ten runs is included in Table III.

It is to be understood that this invention is not limited to the specific examples, which have been offered merely as illustrations, and that modifications may be made without departing from the spirit of this invention.

What is claimed is:

1. An improved process for the preparation of straight chain $C_8$ and $C_{12}$ $\alpha,\omega$-dicarboxylic acids which comprises reacting a cyclic material selected from the group consisting of cyclooctanol, cyclooctanone, cyclododecanol and cyclododecanone with aqueous nitric acid having a concentration of 50 to 70 weight percent in a mole ratio of nitric acid to organic feed of from about 20 to 30/1 at temperatures in the range of 55 to 75° C. in the presence of an ammonium vanadate and copper catalyst for reaction times of ¾ to 4 hours, separating solid products from the reaction mixture at a temperature in the range of 35 to 90° C. and recycling at least a portion of the filtrate separated from the solid products to the reaction.

2. The process of claim 1 in which the cyclic material is a mixture of alcohols and ketones obtained by the air oxidation of cyclododecane.

3. The process of claim 1 in which the cyclic material is a mixture of alcohols and ketones obtained by the air oxidation of cyclooctane.

4. The process of claim 1 in which the nitric acid is of 60 weight percent strength and is supplied, at about a 24–30/1 mole ratio of nitric acid to organic feed ma-

TABLE III.—NITRIC ACID OXIDATION RECYCLE STUDIES

| Run No. | Fresh $HNO_3$, g.[1] | $HNO_3$ Conc., wt. percent | Catalyst, g. | | | Yield, g. | Product Analysis, percent | | DDDA Yield | | Neut. Equiv. | Unknown Content, wt. percent |
|---|---|---|---|---|---|---|---|---|---|---|---|---|
| | | | CD-ol | Cu | $NH_4VO_3$ | | Yield, wt. | DDDA in Product | G. | Mole percent | | |
| 1 | 407.0 | 60.0 | 50.0 | 1.0 | 0.33 | 51.0 | 102.0 | 98.5 | 50.2 | 80.5 | 115 | 0.4 |
| 2 | 97.8 | 60.0 | 50.0 | 0.20 | .07 | 52.4 | 104.8 | 97.5 | 51.1 | 81.8 | 115 | 0.4 |
| 3 | 61.5 | 60.2 | 50.0 | .20 | .07 | 62.4 | 122.8 | 96.2 | 60.0 | 96.0 | 115 | 0.6 |
| 4 | 58.6 | 58.2 | 50.0 | .0 | .0 | 60.2 | 120.4 | 93.6 | 56.4 | 90.5 | 118 | 1.3 |
| 5 | 46.7 | 58.4 | 50.0 | .30 | .10 | 55.8 | 11.6 | 96.0 | 53.6 | 85.7 | 116 | 0.6 |
| 6 | 49.6 | 59.6 | 50.0 | .30 | .10 | 57.6 | 115.2 | 95.8 | 55.2 | 88.4 | 114 | 0.6 |
| 7 | 56.6 | 58.7 | 50.0 | .20 | .07 | 60.6 | 121.2 | 96.1 | 58.3 | 93.2 | 116 | 0.6 |
| 8 | 57.5 | 60.1 | 50.0 | .20 | .07 | 58.4 | 116.8 | 97.0 | 56.7 | 90.7 | 115 | 0.3 |
| 9 | 42.8 | 60.0 | 50.0 | .20 | .07 | 57.4 | 114.8 | 95.7 | 55.0 | 88.1 | 116 | 0.5 |
| 10 | 41.0 | 60.3 | 50.0 | .20 | .07 | 59.7 | 119.4 | 95.8 | 57.2 | 91.6 | 116 | 0.8 |
| Totals | [2] 929.1 | | 500.0 | | | 575.5 | 115.2 (avg.) | 96.2 (avg.) | [3] 559.5 (avg.) | [3] 89.4 (avg.) | 116 (avg.) | |

[1] These numbers represent total grams of treat $HNO_3$ added to the spent nitric before concentrating and use in the oxidation.
[2] Total $HNO_3$ added_____ 929.1 g.
Total $HNO_3$ recovered_____ 457.6 g.

Total $HNO_3$ consumed_____ 471.5=7.49 moles $HNO_3$
7.49/2.45=3.05 moles $HNO_3$/mole DDDA.
7.49/2.72=2.75 moles $HNO_3$/mole cyclodecanol.
[3] Includes 5.8 g. of DDDA remaining in $HNO_3$.

Example 4

SUMMARY OF PURIFICATION RESULTS

| Run No. | Treatment | Sample | DDDA Yield Mol. Percent [1] | Sample Purity | |
|---|---|---|---|---|---|
| | | | | Mol. Percent DDDA | Nitrogen, p.p.m. |
| 1 | Product Rejection | Total crude from reaction.[2] | 88 | 92 | 820 |
| | | 70° C. Insolubles | 86 | 97 | 760 |
| 2 | Water Recrystallization.[3] | Crude DDDA (30 gms.) | | 97.6 | 550 |
| | | Product (21 gms.) | | 99.6 | 310 |
| 3 | Solvent Recrystallization.[3] | Crude DDDA | 73 | (116 N.E.)[4] | 1,400 |
| | | 1 x Recryst. (ethyl acetate). | 69 | (115 N.E.) | 1,210 |
| | | 2 x Recryst. (ethyl acetate). | 54 | (115 N.E.) | 150 |

[1] Yields are mol percent yield on feed to $HNO_3$ oxidation reaction.
[2] Obtained from filtration of $HNO_3$ reaction product at room temperature.
[3] This table also shows purity improvement obtained by (1) a single water recrystallization and (2) multiple recrystallizations (from ethyl acetate) of crude DDDA.
[4] N.E. is neutralization equivalent obtained by titration with ¹⁄₁₀ normal NaOH. This is a rough approximation of product purity.

The above data show the purity improvement, with small loss in yield, obtained by rejecting the 70° C. soluble product in the filtration step.

terial and the amount of catalyst is about 0.05 to about 1.0 weight percent of ammonium vanadate based upon the organic feed and the weight ratio of copper to ammonium vanadate in this catalyst is in the range of 1:1 to 5:1.

5. The process of claim 1 in which solid materials are separated from the reaction mixture at temperatures in the range of 50 to 85° C. and in which 70 to 90 weight percent of the filtrate is recycled to the reaction.

6. An improved process for the preparation of 1,12-dodecanedioic acid which comprises reacting cyclododecanol with aqueous nitric acid having a concentration of 55 to 65 weight percent at temperatures of about 60° C. in the presence of an ammonium vanadate and copper catalyst for reaction times of ¾ to 4 hours, the amount of acid being in the range of from 20 to 30 moles of nitric acid per mole of organic feed, separating solid products from the reaction mixture at a temperature in the range of 60 to 75° C., and recycling at least a portion of the filtrate separated from said solids to the oxidation reaction after adding make-up acid and catalyst and distilling off water to reconstitute the acid oxidizing medium.

7. The process of claim 6 in which the nitric acid is supplied at about 24–30/1 mole ratio of nitric acid to organic feed material and the amount of catalyst is about 0.05 to about 1.0 weight percent of ammonium vanadate based upon the organic feed material and the weight ratio of copper to ammonium vanadate in this catalyst is in the range of 1:1 to 5:1.

8. An improved process for the preparation of 1,12-dodecanedioic acid which comprises reacting cyclododecanone with aqueous nitric acid having a concentration of 55 to 65 weight percent at temperatures of about 60° C. in the presence of an ammonium vanadate and copper catalyst for reaction times of ¾ hour, the amount of acid being in the range of from 20 to 30 moles of nitric acid per mole of organic feed, separating solid products from the reaction mixture at a temperature in the range of 60 to 75° C., and recycling at least a portion of the filtrate separated from said solids to the oxidation reaction after adding makeup acid and catalyst and distilling off water to reconstitute the acid oxidizing medium.

9. The process of claim 8 in which the nitric acid is supplied at about 24–30/1 mole ratio of nitric acid to organic feed material and the amount of catalyst is about 0.05 to about 1.0 weight percent of ammonium vanadate based upon the organic feed material and the weight ratio of copper to ammonium vanadate in this catalyst is in the range of 1:1 to 5:1.

References Cited by the Examiner

UNITED STATES PATENTS

| | | | |
|---|---|---|---|
| 2,557,282 | 6/1951 | Hamblet et al. | 260—531 |
| 2,831,024 | 4/1958 | Brown et al. | 260—531 |
| 3,087,963 | 4/1963 | Wiese et al. | 260—531 |

LORRAINE A. WEINBERGER, *Primary Examiner.*

LEON ZITVER, *Examiner.*

L. A. THAXTON, *Assistant Examiner.*